3,065,223
PROCESS FOR PREPARING STARCH CARBA-
MATES AND THE RESULTING PRODUCT
Charles E. Brockway and Harold R. Ready, Decatur, Ill.,
assignors to A. E. Staley Manufacturing Company,
Decatur, Ill., a corporation of Delaware
No Drawing. Filed Aug. 12, 1960, Ser. No. 49,153
17 Claims. (Cl. 260—233.5)

This invention relates to starch carbamates of unsymmetrical diisocyanates.

Although we are aware that Patent No. 2,562,978 to Wolff discloses the preparation of starch carbamates of monoisocyanates and diisocyanates, the object of our invention is to prepare a new class of starch carbamates based on unsymmetrical diisocyanates and in particular on toluene 2,4-diisocyanate.

Whereas Patent No. 2,562,978 discloses the reaction of diisocyanates directly with starch whereby both of the isocyanato groups of the diisocyanate react with hydroxy groups of starch, the diisocyanates, such as toluene 2,4-diisocyanate, of this invention are modified prior to reaction with starch in order to leave only one isocyanato group available for reaction with starch. The diisocyanates of this invention are modified by reacting the diisocyanate with a molar proportion of monohydroxy organic compound having only one active Zerewitinoff hydrogen atom. In spite of the high reactivity of the isocyanato groups of diisocyanates, adducts having a free isocyanato group can be prepared in good yields from unsymmetrical diisocyanates. This is due primarily to the fact that in unsymmetrical diisocyanates one isocyanato group is usually considerably more reactive than the other. In the case of toluene 2,4-diisocyanate the isocyanato group in the 4-position is about ten times more reactive than the isocyanato group in the 2-position and the following reaction predominates:

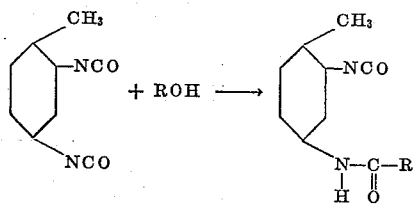

The ROH of the above formula stands for any of: (a) alkanols having from 1–18 carbon atoms such as methanol, ethanol and octadecanol; (b) substituted or modified alcohols such as allyl alcohol, beta-chloroethanol, N,N-diethyl aminoethyl alcohol; (c) phenols, naphthols, halo-substituted phenols and naphthols, and alkyl-substituted phenols and naphthols wherein each alkyl group has from 1–12 carbon atoms, such as p-octyl phenol, o-methyl phenol, p-chlorophenol and 3,5 dibromophenol; (d) partial esters and ethers of glycerol having one free hydroxy group, such as soybean oil diglycerides; and (e) alkylene oxide reaction products with fatty acids, and with any of (a), (b), (c) and (d), e.g., polyethylene glycol ethers of ethanol and polyethylene glycol esters of fatty acids wherein only one free OH group is present. R of the adduct is accordingly an alkoxy group, a phenoxy group, a diacyl glyceroxy group, where the acyl group has from 1–18 carbon atoms, etc. When hydroxy compounds containing tertiary amino groups, such as N,N-diethyl aminoethanol, are reacted with the diisocyanate, a polymerization inhibitor, such as HCl or FeCl₃, must be present to combat the catalytic influence of the tertiary amino group. In addition to the above compounds, other active Zerewitinoff hydrogen compounds may be modified to form adducts by essentially the same reaction. These compounds include: (a) secondary amines, such as dimethyl amine and N-methyl aniline; (b) carboxylic acids, such as benzoic acid, phenylacetic acid, fatty acids having up to 18 carbon atoms, acrylic acid and methacrylic acid; (c) alkyl and aryl mercaptans and (d) primary amines, such as aniline, alkyl amines having from 4–18 carbon atoms, nitro anilines, allylamine, sulfanilic acid, beta-chloroethyl amine, chloro anilines, amino acid esters. These adducts can be prepared by the conventional technique of reacting the active Zerewitinoff hydrogen compound with the diisocyanate using a pyridine catalyst.

The starch used in this invention may be a naturally occurring starch, a modified starch, or a derivative of starch. Corn starch, tapioca starch, rice starch, potato starch, wheat starch, and the amylose and amylopectin fractions therefrom are representative of the various native starches and starch fractions that may be used in this invention. Any of these starches may be modified by enzyme treatment, by oxidation with hypochlorite, or by heating with an acid or may be derivatized by treatment with ethylene oxide or ethylene imine, etc. The starch derivatives also include carboxymethyl starch, carboxyethyl starch, starch esters and other starch ethers. Although the presence of hydroxyl groups on starch is well known, the modified starches or derivatized starches may contain other groups in addition to or in place of these hydroxyl groups. For example, oxidized starches and carboxyalkyl starches contain free carboxyl groups while starches, which have been reacted with ethylene imine, have amino groups, and these, of course, contain active Zerewitinoff hydrogen. For the purposes of this invention, it is immaterial whether the starch is a naturally occurring starch, a modified starch, or a derivative of starch, just so the starch has active Zerewitinoff hydrogen and, accordingly, the word "starch," as used in this specification and claims, includes all of the foregoing. Of course, natural starch, which has been exhaustively esterified, as in starch acetates, or which has been exhaustively etherified with substituents that do not themselves contain active Zerewitinoff hydrogen, are not within the scope of this invention, since they do not contain active Zerewitinoff hydrogen.

The aforementioned isocyanate adducts react readily with the hydroxyl, carboxyl, or amino groups of the starch when the isocyanate is contacted with the starch in the presence of a solvent for the starch under substantially anhydrous conditions at a temperature of from about 20° C. to 120° C. Temperatures above 120° C. should be avoided because of the danger of the adduct's breaking down into its components, and the consequent cross-linking of the starch with a reduction in yield of the desired product. Any organic solvent may be used to carry out this reaction, provided it fulfills each of the following requirements: (1) The organic solvent does not have any Zerewitinoff hydrogen. (2) The starch is soluble in the solvent. Dimethylsulfoxide, N-methyl pyrrolidone, pyridine and N,N-dimethyl formamide are representative of the preferred solvents. Other dialkyl sulfoxides, N-alkyl pyrrolidones and N,N-dialkyl formamides can, of course, be used.

The isocyanate adduct and starch react to form a starch carbamate having the average structure per glucose unit of

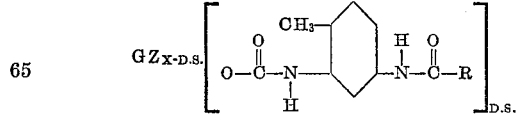

where $GZ_X$ stands for the average glucose unit in the starch, Z stands for the active Zerewitinoff hydrogen-containing hydroxyl and carboxyl groups on the average glucose unit, and R is selected from the group consisting of alkoxy, phenoxy, naphthoxy, diacyl glyceroxy and the mono anhydro-reaction product of an alkylene oxide with an organic compound having a single active Zerewitinoff hydrogen. These starch polymers may also be characterized as having at least one glucose unit having the structure

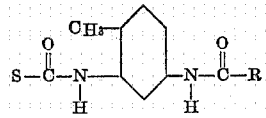

where S is the glucose unit and R is as defined above.

The term "anhydro-" is used in this specification and claims to mean lacking one or more atoms of hydrogen rather than lacking a molecule of water. This definition is consistent with the definition on page 57 of Hackh's Chemical Dictionary, Third Edition.

The products of this invention may be used in paper coatings, as textiles sizes, as adhesives, as clear film coatings, and as surfactants.

The following examples are merely illustrative and should not be construed as limiting the scope of this invention.

EXAMPLE 1

The adducts of this invention were prepared by the following technique:

One hundred seventy-four grams of toluene 2,4-diisocyanate (1.0 mol) and 100 grams of Skellysolve F (hydrocarbon fraction, mostly pentane) were placed in a flask. One and five-hundredths moles of the hydroxy compound containing a catalytic amount of pyridine was added dropwise to the flask while the temperature of the reaction mixture was kept below 40° C. by cooling the flask in water. (For nonyl phenol 10 grams of catalyst was used while with the more reactive hydroxy compounds 5–10 drops of pyridine was sufficient.) After all the hydroxy compound had been added, the reaction mixture was cooled to room temperature. Then the solvent was stripped off at reduced pressure. Whenever a crystalline monourethane was obtained, it was filtered and washed with the same solvent (Skellysolve F) in order to remove the free diisocyanate. The products were over 90% monoisocyanates and contained some diurethane and traces of free diisocyanate. The isocyanate content of these adducts was determined by infrared analysis and butyl amine titration.

Table I lists the results with various monohydroxy adducts of toluene 2, 4-diisocyanate, which were prepared by the above process.

*Table I*

TOLUENE 2,4-DIISOCYANATE REACTION WITH HYDROXY COMPOUND

| Hydroxy Compound | Adduct Equivalent Weight | | Description | Purification |
|---|---|---|---|---|
| | Actual | Theory | | |
| 95% Ethanol, 5% Methanol. | 230 | 218 | Pale yellow crystals, M.P. 60–63° C. | Extract with pentane. |
| 99% Isopropanol | 249 | 234 | Colorless crystals, M.P. 55–60° C. | Do. |
| Octadecanol | 496 | 444 | Colorless crystals, M.P. 65–70° C. | Do. |
| Soybean Oil Alcohols.[1] | 497 | 454 | Solid + oil, solidifies at 0° C. | None. |
| Propylene Oxide-Soybean Fatty Acid,[2] Hydroxyl Eq. Wt.=370. | 560 | 544 | Viscous oil | Do. |
| Soybean Oil Diglycerides. | 954 | 820 | Viscous oil—forms skin at surface and darkens on standing. | Do. |
| Beta-Chloroethanol | ([3]) | 243 | Yellow oil | Extract with pentane. |
| Nonylphenol | 402 | 402 | Pale yellow oil | None. |

[1] Primarily a mixture of oleyl alcohol and linoleyl alcohol.
[2] The reaction product of one mole of a mixture of oleic acid and linoleic acid with approximately 1½ moles of propylene oxide.
[3] Not analyzed.

Example 2

The starch derivatives of the instant invention were prepared by the following technique.

A flask equipped with a thermometer, stirrer, water trap and condenser was charged with 162 grams dried starch (approximately one mole), 500 ml. of dimethyl sulfoxide and 100 ml. of benzene. The mixture was heated to 120° C. to distill off 80 ml. benzene and a trace of water. The anhydrous solution was cooled to 70° C., and the toluene 2, 4-diisocyanate adduct was added dropwise to the reaction mixture while maintaining the temperature at less than 120° C. Specific adducts and the proportions used are set forth in Tables II and III. After 30 to 60 minutes, the products were precipitated, filtered and then dried. The water-soluble derivatives of Table II were precipitated with acetone while the water-insoluble higher diisocyanate adduct substituted derivatives of Table III were precipitated with water.

*Table II*

WATER SOLUBLE STARCH URETHANES

| Starch, 1 mo l | Isocyanate from Toluene Diisocyanate and— | Mols of Adduct | PHS[1] | Percent Yield | Comment |
|---|---|---|---|---|---|
| Dextrin | Nonyl Phenol | .08 | 20 | 92 | H₂O solution gives temporary emulsion with benzene. |
| Oxidized Starch. | do | .04 | 10 | 100 | |
| Do | do | .12 | 30 | 92 | Partly water soluble. |
| Do | 95% Ethanol, 5% Methanol. | .2 | 27 | 100 | Do. |
| Do | Soybean Oil Diglycerides. | .025 | 12 | 96 | Do. |
| Do | Soybean Oil Alcohols. | .025 | 7.7 | 96 | Do. |
| Do | Octadecanol | .025 | 7.7 | ([2]) | Do. |
| Do | Isopropanol | .2 | 31 | ([2]) | Do. |

[1] PHS—Parts isocyanate derivative/100 parts starch by weight.
[2] Not determined.

The oxidized starch used in this example was corn starch oxidized with alkaline hypochlorite and having about 1% carboxyl content.

*Table III*

WATER-INSOLUBLE STARCH URETHANES

| Starch, One Mol | Isocyanate from Toluene Diisocyanate and— | Mols of Adduct | Comment |
|---|---|---|---|
| Oxidized Starch | Octadecanol | .5 | Soluble hot dioxane and methyl Cellulose, forms film on coating glass. |
| Do | Isopropanol | 1.0 | Same as above. |
| Do | do | .5 | Insoluble in methyl Cellosolve. |
| Amylose Fraction Separated from Native Corn Starch. | do | .5 | Insoluble in methyl Cellosolve. |

The above reactions of the toluene 2,4-diisocyanate adducts with starch are essentially quantitative. Products having a degree of substitution of from .01 to 3 can be prepared by the process of this invention by varying the mole ratio of toluene 2,4-diisocyanate adduct from .01 mol to 3 mol per mol of starch.

Many of the water-soluble starch urethanes of Table II can be used as adhesives in pigmented coatings, as surfactants and as clear coatings, while the water-insoluble urethanes can be used in clear coatings.

EXAMPLE 3

This example illustrates a bulk method of carrying out the reaction. Fifteen milliliters of dimethyl sulfoxide was added to an eight ounce jar containing 64.8 grams (.4 mol) of hypochlorite oxidized starch. After mixing with a spatula, the jar was placed on rollers for one hour. During this time a doughy mass was formed. After adding .025 mole of soybean oil alcohol-toluene diisocyanate adduct to the doughy mass, the jar was placed on rollers for two hours. The jar was then maintained at 70° C. for four hours. The product was extracted with 50 ml. benzene. Infrared analysis of the extract showed the absence of free isocyanate. The product was filtered, washed with benzene and acetone, and dried.

Since many embodiments of this invention may be made and since many changes may be made in the embodiments described, the foregoing is to be interpreted as illustrated only and our invention is defined by the claims appended hereafter.

We claim:
1. The process of reacting at a temperature of from about 20° C. to about 120° C. dry starch and an adduct of an unsymmetrical diisocyanate in the presence of an inert organic solvent for said starch, said organic solvent being free of active Zerewitinoff hydrogen, said adduct having one free isocyanato group and one carbamate group, where said carbamate group is the reaction product of the more reactive of the two isocyanate groups of the unsymmetrical diisocyanate and a monohydroxy organic compound having only one active Zerewitinoff hydrogen, wherein the diisocyanate adduct is present in the amount of from .01 mol to 3.0 mols per mol of starch.

2. The process of reacting at a temperature of from about 20° C. to about 120° C. dry starch and an adduct of toluene 2,4-diisocyanate in the presence of an inert organic solvent for said starch, said organic solvent being free of active Zerewitinoff hydrogen, said adduct having a free isocyanato group in the two-position and a carbamate group in the four-position, which is the reaction product of the isocyanato group in the four-position and a monohydroxy organic compound having only one active Zerewitinoff hydrogen, wherein the diisocyanate adduct is present in the amount of from .01 mol to 3.0 mols per mol of starch.

3. The process of reacting at a temperature of from about 20° C. to about 120° C. dry starch and a diisocyanate adduct in the presence of an inert organic solvent for said starch, said organic solvent being free of active Zerewitinoff hydrogen, said adduct having the structure

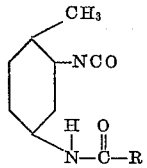

where R is a group free of active Zerewitinoff hydrogen selected from the group consisting of an alkoxy group having from 1–18 carbon atoms, a phenoxy group, a naphthoxy group, a diacylglyceroxy group, the anhydro reaction product of an alkylene oxide, and mixtures thereof, said anhydro reaction product being the reaction product of an alkylene oxide with at least one member selected from the group consisting of an alcohol having from 1–18 carbon atoms, a phenol, a naphthol and a monocarboxylic acid, wherein the diisocyanate adduct is present in the amount of from .01 mol to 3.0 mols per mol of starch.

4. The process of claim 3 wherein the starch is an oxidized starch.
5. The process of claim 3 wherein the starch is a dextrin.
6. The process of claim 3 wherein the starch is the amylose fraction separated from native starch.
7. The process of claim 3 where R is a nonyl phenoxy.
8. The process of claim 3 where R is a mixture of a methoxy and ethoxy.
9. The process of claim 3 where R is diacyl glyceroxy.
10. The process of claim 3 where R is anhydro soybean oil alcohol.
11. The process of claim 3 where R is isopropoxy.
12. The process of claim 3 where the organic solvent is selected from the group consisting of dimethylsulfoxide, N-methyl pyrrolidone, pyridine and N,N-dimethylformamide.
13. A starch carbamate characterized in that it contains at least one glucose unit having the structure

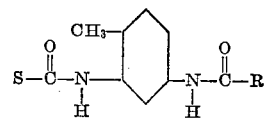

where S is the glucose unit residue and R stands for a group free of active Zerewitinoff hydrogen selected from the group consisting of an alkoxy group having from 1–18 carbon atoms, a phenoxy group, a naphthoxy group, a diacyl glyceroxy group, the anhydro reaction product of an alkylene oxide, and mixtures thereof, said anhydro reaction product being the reaction product of an alkylene oxide with at least on member selected from the group consisting of an alcohol having from 1–18 carbon atoms, a phenol, a naphthol and a monocarboxylic acid.

14. The product of claim 13 where the starch carbamate has a D.S. from .01 to 3 inclusive.
15. The product of claim 13 where the starch is an oxidized starch.
16. The product of claim 13 where the starch is dextrin.
17. The product of claim 13 where the starch is the amylose fraction separated from native starch.

References Cited in the file of this patent
UNITED STATES PATENTS

| | | |
|---|---|---|
| 2,562,978 | Wolff | Aug. 7, 1951 |
| 2,668,169 | Wolff et al. | Feb. 2, 1954 |

UNITED STATES PATENT OFFICE

CERTIFICATE OF CORRECTION

Patent No. 3,065,223　　　　　　　　　　　　November 20, 1962

Charles E. Brockway et al.

It is hereby certified that error appears in the above numbered patent requiring correction and that the said Letters Patent should read as corrected below.

Column 4, TABLE II, third column, line 3 thereof, for "12" read -- .12 --; column 5, line 14, for "illustrated" read -- illustrative --; column 6, line 16, for "R is a nonyl phenoxy" read -- R is nonyl phenoxy --.

Signed and sealed this 7th day of January 1964.

(SEAL)
Attest:

ERNEST W. SWIDER　　　　　　　　　　　　EDWIN L. REYNOLDS

Attesting Officer　　　　　　　　　　　　Acting Commissioner of Patents